US012432470B2

(12) United States Patent
Lim

(10) Patent No.: US 12,432,470 B2
(45) Date of Patent: Sep. 30, 2025

(54) MECHANISM OF EFFECTIVELY SHORTENING SETTLING TIME OF PIXEL CIRCUIT

(71) Applicant: PixArt Imaging Inc., Hsin-Chu (TW)

(72) Inventor: Wooi Kip Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 168 days.

(21) Appl. No.: 18/539,269

(22) Filed: Dec. 14, 2023

(65) Prior Publication Data
US 2025/0203240 A1    Jun. 19, 2025

(51) Int. Cl.
*H04N 25/709* (2023.01)
*H04N 23/667* (2023.01)
*H04N 25/77* (2023.01)

(52) U.S. Cl.
CPC ......... *H04N 25/709* (2023.01); *H04N 23/667* (2023.01); *H04N 25/77* (2023.01)

(58) Field of Classification Search
CPC .... H04N 25/77; H04N 25/709; H04N 23/667; H10F 39/197; H10F 30/24; H10F 30/245; H10F 71/135
See application file for complete search history.

(56) References Cited

U.S. PATENT DOCUMENTS

| 9,412,784 | B1* | 8/2016 | Lim | ...................... H10F 39/197 |
| 2015/0042566 | A1* | 2/2015 | Lim | ...................... H10F 39/197 |
| | | | | 250/214 R |
| 2019/0123091 | A1* | 4/2019 | Lim | ...................... H04N 25/77 |
| 2021/0368113 | A1* | 11/2021 | Lim | ...................... H10F 39/197 |
| 2025/0047991 | A1* | 2/2025 | Lim | ...................... H04N 25/771 |

OTHER PUBLICATIONS

G. Kim et al., "Bipolar Transistor Equivalents in CMOS Technology"—38th Midwest Symposium on Circuits and Systems, Proceedings IEEE, Aug. 13-16, 1995, pp. 45-48. (Year: 1995).*

* cited by examiner

*Primary Examiner* — Marly S Camargo
(74) *Attorney, Agent, or Firm* — Winston Hsu

(57) ABSTRACT

A method of an image sensor device includes: providing a pixel array having multiple bipolar junction transistor (BJT) pixel circuits arranged in N rows and M columns; and shortening a setting time period of a BJT sensing circuit in the pixel array during the setting time period by dynamically changing a bias current provided from a current source of the BJT sensing circuit during the setting time period.

15 Claims, 3 Drawing Sheets

MECHANISM OF EFFECTIVELY SHORTENING SETTLING TIME OF PIXEL CIRCUIT

BACKGROUND OF THE INVENTION

1. Field of the Invention

The invention relates to an image sensing mechanism, and more particularly to an image sensor device, a corresponding method, and a corresponding BJT pixel circuit.

2. Description of the Prior Art

Generally speaking, a conventional bipolar junction transistor (BUT) sensing pixel needs to wait for a longer setting time period after a voltage signal of the BJT sensing pixel is reset. The total time length of an image frame is also increased due to that the longer setting time period, and also the corresponding frame rate is lower.

SUMMARY OF THE INVENTION

Therefore one of the objectives of the invention is to provide an image sensor device, a pixel circuit, and a method of the image sensor device, to solve the problems.

According to embodiments of the invention, an image sensor device is disclosed. The image sensor device comprises a pixel array and a controller. The pixel array has multiple bipolar junction transistor (BJT) pixel circuits arranged in N rows and M columns. The controller is coupled to the pixel array and is configured to shorten a setting time period of a BIT sensing circuit in the pixel array during the setting time period by dynamically changing a bias current provided from a current source of the BJT sensing circuit during the setting time period.

According to the embodiments, a bipolar junction transistor (BJT) pixel circuit, to be disposed in a pixel array, is disclosed. The BJT pixel circuit comprises a BJT photo sensing transistor, a photodiode, a storage capacitor, an amplifier circuit having a current source, and a shutter circuit. The BJT photo sensing transistor has a collector coupled to a ground level, a base, and an emitter. The photodiode is coupled between the base of the BJT photo sensing transistor and the ground level and is used for receiving and sensing light. The storage capacitor is coupled between the shutter circuit and the ground level. The amplifier circuit having a current source is coupled to the shutter circuit, the photodiode, and the BJT photo sensing transistor, and is used for using the current source providing a bias current. The shutter circuit is coupled to the amplifier circuit. The bias current provided from the current source is dynamically changed during a setting time period of the BJT pixel circuit to shorten the setting time period.

According to the embodiments, a method of an image sensor device is disclosed. The method comprises: providing a pixel array having multiple bipolar junction transistor (BUT) pixel circuits arranged in N rows and M columns; and shortening a setting time period of a BIT sensing circuit in the pixel array during the setting time period by dynamically changing a bias current provided from a current source of the BJT sensing circuit during the setting time period.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution capable of effectively reducing/shortening the setting time of one or more pixel units such as BJT (bipolar junction transistor) pixel circuits disposed within a pixel array of an image sensor device such as an optical sensor device (e.g. an optical mouse device, but not limited). Thus, this technical solution can also maximize or increase the frame rate correspondingly as well as save more power.

Figure 1:
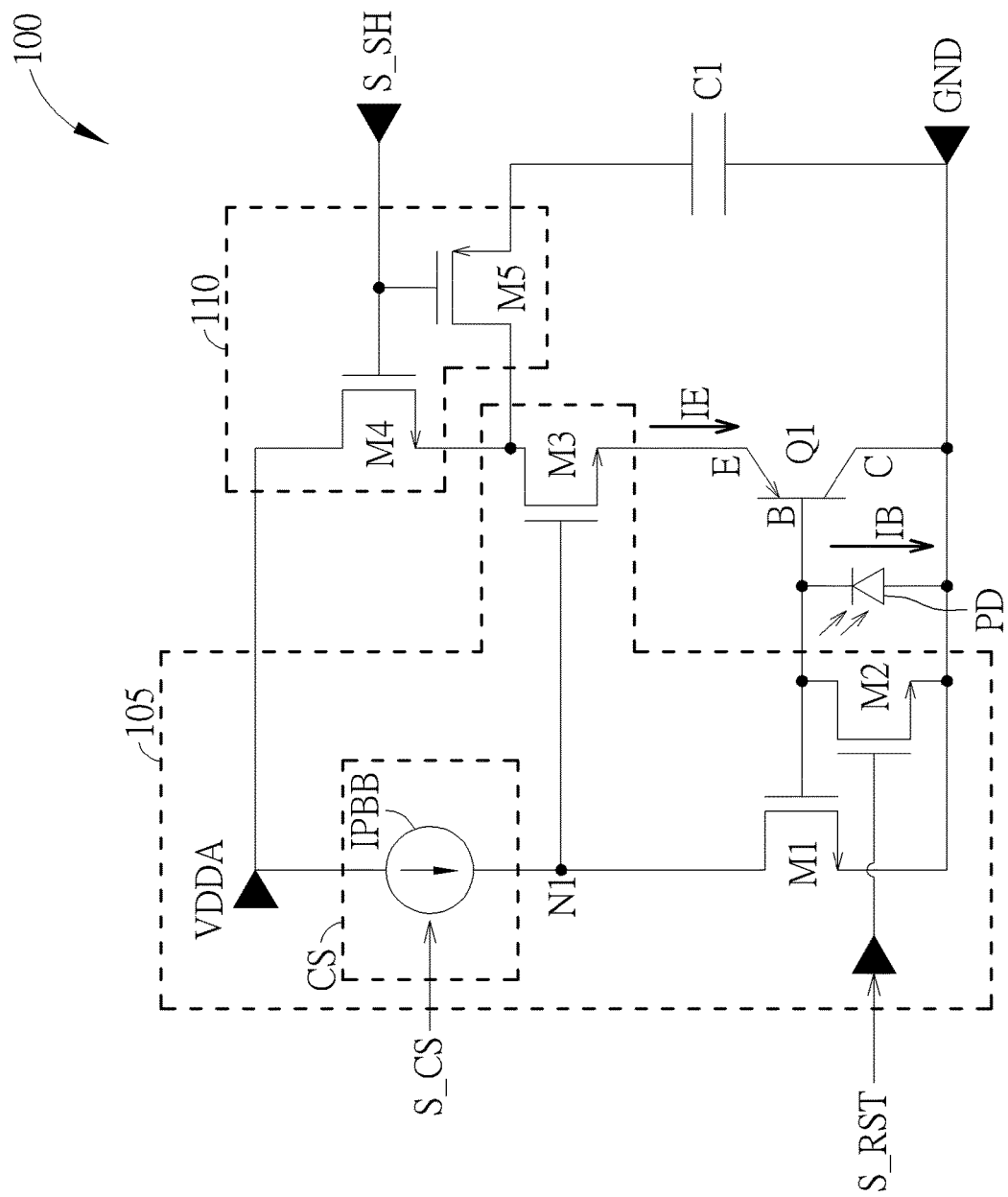
FIG. 1 is a diagram of a novel pixel unit/circuit such as a bipolar junction transistor (BJT) sensing pixel (or referred to as a BJT pixel unit) disposed in a pixel array according to an embodiment of the invention.
Figure 2:
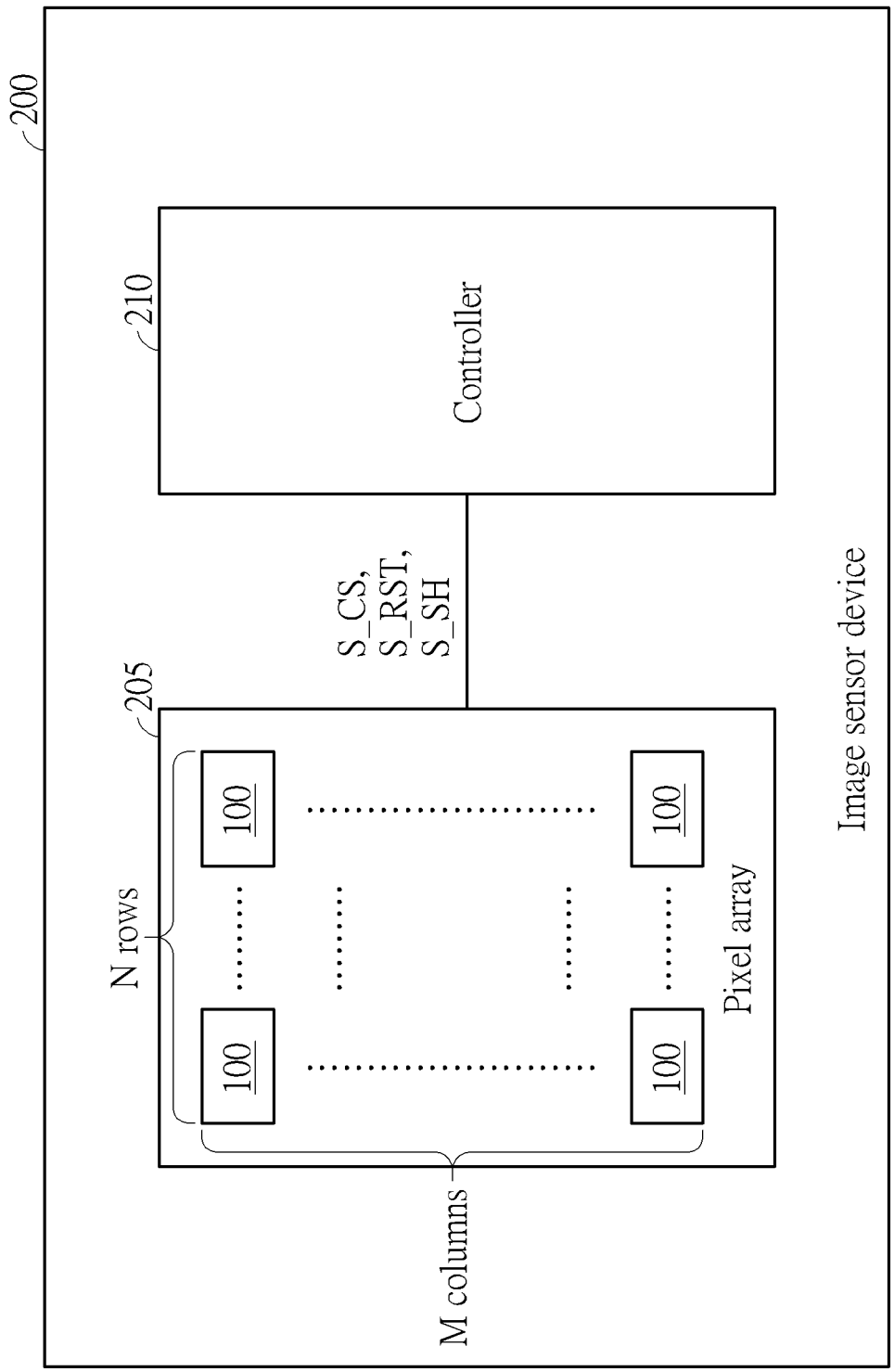
FIG. 2 is a diagram of an image sensor device such as an optical sensor device comprising the pixel array having multiple pixel circuits as shown in FIG. 1 according to an embodiment of the invention.

Refer to FIG. 1 in conjunction with FIG. 2. FIG. 1 is a diagram of a novel pixel unit/circuit 100 such as a bipolar junction transistor (BJT) sensing pixel (or referred to as a BJT pixel unit/circuit) disposed in a pixel array according to an embodiment of the invention. FIG. 2 is a diagram of an image sensor device 200 such as an optical sensor device comprising the pixel array 205 having multiple pixel circuits 100 as shown in FIG. 1 according to an embodiment of the invention. As shown in FIG. 1, the novel BJT pixel circuit 100 comprises a photo transistor such as a BJT-based photo sensing transistor Q1, a photodiode PD such as light emission diode (LED), a storage capacitor C1, an amplifier circuit 105 having a current source CS, and a shutter circuit 110. The amplifier circuit 105 comprises the current source CS and transistors M1-M3, wherein the current source CS is used for providing a bias current IPBB. The shutter circuit 110 comprises transistors M4 and M5. As shown in FIG. 2, the image sensor device 200 comprises the pixel array 205 and the controller 210, and the pixel array 205 comprises multiple pixel circuits 100 being arranged in N rows and M columns. The controller 210 is used for generating and outputting different control signals S_CS, S_RST, and S_SH into the pixel array 205 to control one or more pixel circuits 100.

In FIG. 1, for the circuit structure and connections, the current source CS is coupled between the supply voltage VDDA and an intermediate node N1 which is connected to the gate of the transistor M3 and the drain of the transistor M1. The transistor M1 has the drain coupled to the intermediate node N1, has the source coupled to the ground level GND, and has the gate coupled to the base of the BJT transistor Q1. The transistor M2 has the drain coupled to the base of the BJT transistor Q1, has the source coupled to the ground level GND, and has the gate coupled to and controlled by the control signal S_RST. The transistor M3 has the drain coupled to the source of the transistor M4 and the drain of transistor M5, has the source coupled to the emitter of BJT transistor Q1, and has the gate coupled to the intermediate node N1. The photodiode PD is coupled between the base of BJT transistor Q1 and the ground level GND and is used to collecting light so as to generate the current signal IB passing from the base of BJT transistor Q1 into the collector of BJT transistor Q1 through the photodiode PD. The transistor M4 has the drain coupled to the supply voltage VDDA, has the source coupled to the drain of transistor M3, and has the gate coupled to and controlled by the control signal S_SH. The transistor M5 has the drain coupled to the drain of transistor M3, has the source coupled to a first end of the storage capacitor C1, and has the gate coupled to and controlled by the control signal S_SH. The storage capacitor C1 is coupled between the source of transistor M5 and the ground level GND.

The image sensor device 200 (or pixel circuit 100) has two modes in which a first mode is to use the bias current IPBB having a substantially fixed bias current and a second mode is to use the bias current IPBB having a dynamically adjusted/changed bias current. The controller 210 can determine to use either the first mode or the second mode. In the second mode, the setting time can be shortened and the power consumption can be reduced. In addition, the controller 210 can appropriately determine whether to enable the second mode or not.

Figure 3:
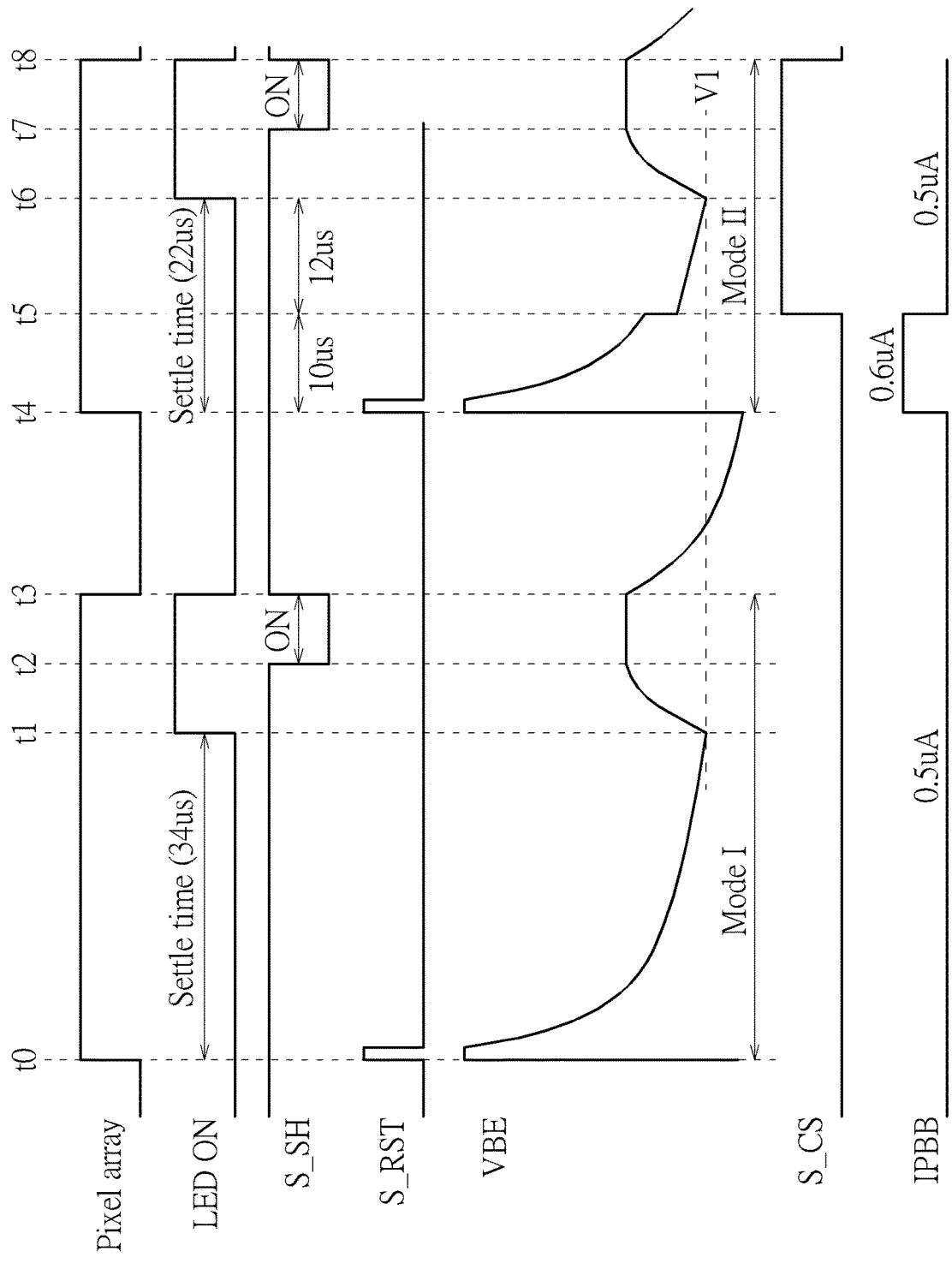
FIG. 3 is a diagram showing an example of the image sensor device (or pixel circuit) respectively operating under the first mode and the second mode according to an embodiment of the invention.

FIG. 3 is a diagram showing an example of the image sensor device 200 (or pixel circuit 100) respectively operating under the first mode and the second mode according to an embodiment of the invention. In FIG. 3, the first mode is enabled (i.e. the second mode is disabled) during the time period from t0 to t3, and the second mode is enabled during another time period from t4 to t8. A first frame begins at time to and ends at time t3, and a second frame begins at time t4 and ends at time t8.

For the first frame corresponding to the first mode (i.e. Mode I), the pixel array 205 is turned on ("indicated by the high level '1') at time to and is turned off (indicated by the low level '0') at time t3. In the first mode, the bias current IPBB is not changed and is substantially identical and fixed at for example 0.5 uA.

In practice, the controller 210 operating in the first mode can generate and output the control signal S_CS having the low level to control the current source CS outputting the identical and fixed bias current IPBB such as 0.5 uA (microamprere) during the whole frame time from t0 to t3. The setting time of the first frame begins at time to and ends at time t1 and can be indicated by the low level ('LED ON' signal) as shown in FIG. 3. In practice, the controller 210 can generate the control signal S_RST (i.e. the reset control signal) having the impulse signal to suddenly turning on the transistor M2 so as to suddenly pull up and reset the voltage VBE, and then with time the voltage VBE will decay to become lower and for example may be decreased into a reference voltage V1 at time t1. For instance, the timing t1 is determined by the controller 210. The controller 210 may turn on (or enable) the photodiode PD (indicated by the high level) at time t1 so that the voltage VBE is decreased into the reference voltage V1 at time t1 and then is increased. Then, the controller 210 can generate the control signal S_SH having the low level '0' to turn on and enable the shutter circuit 110 so that the voltage VBE for example may be saturated at a specific voltage during the time period from t2 to t3. Then, after the first frame ends at time t3, the voltage VBE decays again and becomes lower. In this example, the setting time in the first mode corresponding to the substantially fixed bias current IPBB such as 0.5 uA may be 34 us (microseconds) (but not limited).

For the second frame corresponding to the second mode, the pixel array 205 is turned on ("indicated by the high level '1') at time t4 and is turned off (indicated by the low level '0') at time t8. In the second mode (i.e. Mode II), the bias current IPBB is dynamically changed and for example may be switching between two different bias current values such as 0.6 uA and 0.5 uA. The controller 210 operating in a first step of the second mode can generate and output the control signal S_CS having the low level to control the current source CS outputting a larger bias current IPBB having 0.6 uA during a time period from t4 to t5 and then it is a second step of the second mode can generate and output the control signal S_CS having the high level to control the current source CS outputting a smaller bias current IPBB having 0.5 uA during a time period from t5 to t8.

In practice, in the second mode, the controller 210 can generate the control signal S_RST (i.e. the reset control signal) having the impulse signal to suddenly turning on the transistor M2 so as to suddenly pull up and reset the voltage VBE, and then with time the voltage VBE will become lower and for example may be decreased into a lower level. Since the bias current IPBB is suddenly switched form the larger current 0.6 uA into the smaller 0.5 uA at time t5, the voltage VBE correspondingly drops from a higher level into a lower level immediately. Thus, for example (but not limited), the setting time for the second frame will become shorter and for example may be 22 us which is the time period 10 us from t4 to t5 plus the time period 12 us from t5 to t6. That is, in the second mode, the voltage VBE can more rapidly decay into the same reference voltage V1. By doing so, the total time length needed by the second frame will be shorter than that needed by the first frame. In addition, similarly, the controller 210 may turn on (or enable) the photodiode PD (indicated by the high level) at time t6 so that the voltage VBE is decreased into the reference voltage V1 at time t6 and then is immediately increased. Then, the controller 210 can generate the control signal S_SH having the low level '0' to turn on and enable the shutter circuit 110 so that the voltage VBE for example may be saturated at a specific voltage during the time period from t7 to t8. Then, after the first frame ends at time t8, the voltage VBE decays and becomes lower. In this example, the setting time in the second mode corresponding to the dynamically switched fixed bias current IPBB is shorter than the setting time in the first mode corresponding to the substantially fixed bias current. By changing the bias current provided from the current source IPBB during the settling time, the time length of the setting time can be shortened.

With the voltage VBE suddenly drops, the setting time needed to settle to the reference level V1 will become shorter, and this will help to shorten the frame period as well increase the fame rate. Also, the turned-on time period of the pixel array 205 can be reduced to save power. For example (but not limited), if the pixel array 205 has pixel units arranged in 30 rows and 30 columns without dynamically adjusting/changing the bias current IPBB, then the total consumed energy during the settle time may be 30×30×0.5 uA×1.8V×34 us=27.540 nJ wherein the bias current is 0.5 uA, the supply voltage is 1.8 Volts; nJ means Nano joule, and the actual time length of the corresponding setting time is 34 us. Instead, if the pixel array 205 has the pixel units arranged in 30 rows and 30 columns with dynamically adjusting/changing the bias current IPBB, then the total needed energy during the corresponding settle time may be 30×30×0.6 uA×1.8V×10 us+30×30×0.5 uA×1.8V×12 us=19.44 nJ. Thus, the second mode consumes less power than the first mode; there is about 30% power can be saved.

Further, in one embodiment, the controller 210 may control the current source CS generating and providing a much larger bias current larger than 0.6 uA to make the voltage VBE more significantly drop when the control signal S_CS is switched from the low level into the high level in the second mode, so that the settling time of the second frame can be much shorter and the maximum frame rate can be increased. The power consumption required for one frame also can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor device, comprising:
   a pixel array, having multiple bipolar junction transistor (BJT) pixel circuits arranged in N rows and M columns; and
   a controller, coupled to the pixel array, configured to shorten a setting time period of a BJT sensing circuit in the pixel array during the setting time period by dynamically changing a bias current provided from a current source of the BJT sensing circuit during the setting time period.

2. The image sensor device of claim 1, wherein the controller is arranged to reset a voltage across a base and an emitter of a BJT-based photo sensing transistor of the BJT sensing circuit in the pixel array at a start of the setting time period, to control the current source providing a first bias current during a first time interval of the setting time period, and then to control the current source providing a second bias current during a second time interval of the setting time period; the first time interval is followed by the second time interval, and the first bias current is different from the second bias current.

3. The image sensor device of claim 2, wherein the first bias current is larger than the second bias current.

4. The image sensor device of claim 3, wherein the controller controls the bias current of the current source immediately switching from the first bias current into the second bias current to make a voltage drop suddenly occur in the voltage across the base and the emitter when the voltage decays so as to shorten the setting time period.

5. The image sensor device of claim 1, wherein the controller controls the bias current provided from the current source switching between the first bias current and the second bias current during the setting time period.

6. A bipolar junction transistor (BJT) pixel circuit, to be disposed in a pixel array, comprising:
   a BJT photo sensing transistor, having a collector coupled to a ground level, having a base, and having an emitter;
   a photodiode, coupled between the base of the BJT photo sensing transistor and the ground level, for receiving and sensing light;
   a storage capacitor, coupled between the shutter circuit and the ground level;
   an amplifier circuit having a current source, coupled to the shutter circuit, the photodiode, and the BJT photo sensing transistor, for using the current source providing a bias current; and
   a shutter circuit, coupled to the amplifier circuit;
   wherein the bias current provided from the current source is dynamically changed during a setting time period of the BJT pixel circuit to shorten the setting time period.

7. The BJT pixel circuit of claim 6, wherein the controller is arranged to reset a voltage across a base and an emitter of a BJT-based photo sensing transistor of the BJT sensing circuit in the pixel array at a start of the setting time period, to control the current source providing a first bias current during a first time interval of the setting time period, and then to control the current source providing a second bias current during a second time interval of the setting time period; the first time interval is followed by the second time interval, and the first bias current is different from the second bias current.

8. The BJT pixel circuit of claim 7, wherein the first bias current is larger than the second bias current.

9. The BJT pixel circuit of claim 8, wherein the bias current of the current source is immediately switched from the first bias current into the second bias current to make a voltage drop suddenly occur in the voltage across the base and the emitter when the voltage decays so as to shorten the setting time period.

10. The BJT pixel circuit of claim 6, wherein the bias current provided from the current source switches between the first bias current and the second bias current during the setting time period.

11. A method of an image sensor device, comprising:
    providing a pixel array having multiple bipolar junction transistor (BJT) pixel circuits arranged in N rows and M columns; and
    shortening a setting time period of a BIT sensing circuit in the pixel array during the setting time period by dynamically changing a bias current provided from a current source of the BJT sensing circuit during the setting time period.

12. The method of claim 11, further comprising:
    resetting a voltage across a base and an emitter of a BJT-based photo sensing transistor of the BJT sensing circuit in the pixel array at a start of the setting time period;
    controlling the current source providing a first bias current during a first time interval of the setting time period; and
    controlling the current source providing a second bias current during a second time interval of the setting time period;
    wherein the first time interval is followed by the second time interval, and the first bias current is different from the second bias current.

13. The method of claim 12, wherein the first bias current is larger than the second bias current.

14. The method of claim 13, further comprising:
    controlling the bias current of the current source immediately switching from the first bias current into the second bias current to make a voltage drop suddenly occur in the voltage across the base and the emitter when the voltage decays so as to shorten the setting time period.

15. The method of claim 11, further comprising:
    controlling the bias current provided from the current source switching between the first bias current and the second bias current during the setting time period.

* * * * *